United States Patent
Sakai et al.

(10) Patent No.: US 8,508,678 B2
(45) Date of Patent: Aug. 13, 2013

(54) LIQUID CRYSTAL DISPLAY DEVICE, TOUCH PANEL, AND DISPLAY DEVICE INCLUDING THE SAME

(75) Inventors: Takehiko Sakai, Osaka (JP); Dai Chiba, Osaka (JP); Yoshiharu Kataoka, Osaka (JP); Takuya Watanabe, Osaka (JP); Shogo Nishiwaki, Osaka (JP); Kazunori Morimoto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 366 days.

(21) Appl. No.: 13/063,773

(22) PCT Filed: Jun. 17, 2009

(86) PCT No.: PCT/JP2009/002764
§ 371 (c)(1),
(2), (4) Date: Mar. 14, 2011

(87) PCT Pub. No.: WO2010/035371
PCT Pub. Date: Apr. 1, 2010

(65) Prior Publication Data
US 2011/0175836 A1    Jul. 21, 2011

(30) Foreign Application Priority Data
Sep. 25, 2008 (JP) ................. 2008-245646

(51) Int. Cl.
*G02F 1/1335* (2006.01)
(52) U.S. Cl.
USPC ............................................. 349/12
(58) Field of Classification Search
USPC ............................................. 349/12
See application file for complete search history.

(56) References Cited

U.S. PATENT DOCUMENTS

| | | | |
|---|---|---|---|
| 6,067,144 A * | 5/2000 | Murouchi | 349/156 |
| 6,501,529 B1 | 12/2002 | Kurihara et al. | |
| 7,675,580 B2 * | 3/2010 | Rho | 349/12 |
| 8,049,735 B2 * | 11/2011 | Lee et al. | 345/173 |
| 8,134,652 B2 * | 3/2012 | Rho et al. | 349/12 |
| 8,184,256 B2 * | 5/2012 | You et al. | 349/155 |

FOREIGN PATENT DOCUMENTS

| | | |
|---|---|---|
| JP | 08-286812 A | 11/1996 |
| JP | 10-275541 A | 10/1998 |
| JP | 2001-075074 A | 3/2001 |
| JP | 2002-007050 A | 1/2002 |

OTHER PUBLICATIONS

Official Communication issued in International Patent Application No. PCT/JP2009/002764, mailed on Oct. 6, 2009.

* cited by examiner

*Primary Examiner* — James Dudek
(74) *Attorney, Agent, or Firm* — Keating & Bennett, LLP

(57) ABSTRACT

A liquid crystal display device includes an active matrix substrate (20a) including a plurality of first touch panel interconnects (19b) extending in parallel with each other, a counter substrate (30a) facing the active matrix substrate (20a) and including a plurality of second touch panel interconnects (25a) extending in parallel with each other in a direction intersecting the first touch panel interconnects (19b), a liquid crystal layer (40) provided between the active matrix substrate (20a) and the counter substrate (30a) with an alignment film (9a, 9b) being interposed between the liquid crystal layer (40) and each of the active matrix substrate (20a) and the counter substrate (30a), and a plurality of columnar touch pins (P) connected to the first or second touch panel interconnects (19b, 25a). Repellency to the alignment films (9a, 9b) is imparted to at least a portion of a top portion of each of the touch pins (P).

15 Claims, 13 Drawing Sheets

(a)

(b)

(a)

(b)

(a)

(b)

(c)

(a)

(b)

(a)

(b)

(c)

(a)

(b)

(c)

LIQUID CRYSTAL DISPLAY DEVICE, TOUCH PANEL, AND DISPLAY DEVICE INCLUDING THE SAME

TECHNICAL FIELD

The present invention relates to liquid crystal display devices, touch panels, and display devices including the same.

BACKGROUND ART

A touch panel (touch screen) is a device for inputting information to an information processing device, such as a computer etc., in an interactive manner by touching (pressing) the panel using a finger, a pen, etc.

There are different types of touch panels based on different operating principles: resistive; capacitive; infrared; ultrasonic; electromagnetic inductive; etc. Resistive and capacitive touch panels are recently most commonly used in display devices etc., because of the low cost of mounting.

The resistive touch panel includes, for example, a pair of substrates facing each other, a pair of transparent conductive films provided as resistive films on inner surfaces of the pair of substrates, an insulating spacer interposed between the pair of substrates to form an air layer between the pair of transparent conductive films, and a position detection circuit which detects a touch position. The resistive touch panel is, for example, mounted on the front surface of the display screen of a liquid crystal display panel.

In the resistive touch panel thus configured, when the front surface of the touch panel is touched, the pair of transparent conductive films contact each other (make a short circuit), so that a current flows between the pair of transparent conductive films. Based on a change in voltage when a current flows between the pair of transparent conductive films, the position detection circuit detects the touch position.

For example, PATENT DOCUMENT 1 describes a resistive transparent touch panel in which a non-reactive silicone oil is interposed between a transparent substrate and a resistive film provided on another transparent substrate, adhering to a surface of the resistive film.

CITATION LIST

Patent Document

PATENT DOCUMENT 1: Japanese Patent Publication No. H10-275541

SUMMARY OF THE INVENTION

Technical Problem

Incidentally, a liquid crystal display panel includes, for example, an active matrix substrate and a counter substrate facing each other, and a liquid crystal layer provided between the active matrix substrate and the counter substrate. Therefore, when the resistive touch panel is mounted on the front surface of the liquid crystal display panel of the liquid crystal display device, there are four constituent substrates, i.e., the pair of substrates included in the touch panel, the active matrix substrate, and the counter substrate, resulting in an increased overall thickness of the display device. For example, in recent years, a liquid crystal display device (liquid crystal display panel) including a matrix type (digital type) resistive touch panel has been proposed.

The liquid crystal display device including the matrix type resistive touch panel includes, for example, a plurality of first touch panel interconnects provided as a resistive film on a surface closer to the liquid crystal layer of the active matrix substrate, extending in parallel with each other, and a plurality of second touch panel interconnects provided as another resistive film on a surface closer to the liquid crystal layer of the counter substrate, extending in parallel with each other in a direction perpendicular to the first touch panel interconnects. When a surface of the active matrix substrate or the counter substrate is pressed, a first touch panel interconnect and a second touch panel interconnect corresponding to the pressed position contact each other at the pressed position, whereby conduction is established therebetween. Here, each first or second touch panel interconnect has a columnar touch pin at an intersection therebetween. The touch pin allows conduction to be established between the first and second touch panel interconnects when their intersection is located at the pressed position.

In the liquid crystal display panel, however, an alignment film for aligning liquid crystal molecules in the liquid crystal layer needs to be provided on a surface closer to the liquid crystal layer of each of the active matrix substrate and the counter substrate. The alignment films act as resistance components between the first and second touch panel interconnects, likely leading to malfunction of the touch panel. Here, in general, the alignment film is substantially uniformly formed on the substrate surface by a printing technique. Therefore, it is technologically difficult to expose from alignment film only a portion where the touch pin is provided, i.e., a top portion of the touch pin.

By covering only the side surface of the touch pin, leaving the top portion of the touch pin exposed from the insulating film, in the matrix type resistive touch panel itself, not only the above-described malfunction of the touch panel due to the alignment films in the liquid crystal display device including the matrix type resistive touch panel, but also an unwanted short circuit between the first and second touch panel interconnects due to, for example, foreign conductive particles, can be effectively reduced or prevented.

The present invention has been made in view of the above problems. It is an object of the present invention to ensure conduction at the top portion of the touch pin in the matrix type resistive touch panel.

Solution to the Problem

To achieve the object, in the present invention, repellency to an alignment film or a protective film is imparted to at least a portion of a top portion of each touch pin.

Specifically, a liquid crystal display device according to the present invention includes an active matrix substrate including a plurality of first touch panel interconnects extending in parallel with each other, a counter substrate facing the active matrix substrate and including a plurality of second touch panel interconnects extending in parallel with each other in a direction intersecting the first touch panel interconnects, a liquid crystal layer provided between the active matrix substrate and the counter substrate with an alignment film being interposed between the liquid crystal layer and each of the active matrix substrate and the counter substrate, and a plurality of columnar touch pins connected to the first or second touch panel interconnects. When a surface of the active matrix substrate or the counter substrate is pressed, conduction is established between at least one of the first touch panel interconnects and a corresponding at least one of the second touch panel interconnects via a corresponding at least one of the touch pins. Repellency to the alignment film is imparted to at least a portion of a top portion of each of the touch pins.

With the above configuration, the first touch panel interconnects on the active matrix substrate intersect the second touch panel interconnects on the counter substrate with (the alignment film/) the liquid crystal layer (/the alignment film) being interposed therebetween. When a surface of the active matrix substrate or the counter substrate is pressed, conduction is established between at least one of the first touch panel interconnects and at least one of the second touch panel interconnects via at least one of the touch pins connected to the first or second touch panel interconnects. Therefore, a matrix type resistive touch panel is incorporated in a liquid crystal display device. Repellency to the alignment film is imparted to at least a portion of the top portion of each touch pin, so that at least a portion of the top portion of each touch pin is exposed from the alignment film. Therefore, the alignment film does not act as a resistance component between the first and second touch panel interconnects. Therefore, in the matrix resistive touch panel incorporated in the liquid crystal display device, conduction can be reliably established at the top portion of the touch pin.

The touch pins may each have a top portion including a first member and a second member made of different materials.

With the above configuration, the first and second members made of different materials have different repellencies (less repellent/more repellent) specific to the respective materials with respect to the alignment film. Therefore, since the top portion of each touch pin has the first and second members, the top portion of the touch pin has a portion which is relatively likely to repel the alignment film. The portion which is relatively likely to repel the alignment film is a portion to which repellency to the alignment film is imparted. Therefore, at least a portion of the top portion of each touch pin is specifically exposed from the alignment film.

The first member may be made of a conductive inorganic material, and the second member may be made of an organic material.

With the above configuration, the first member is made of a conductive inorganic material, and the second member is made of an organic material. Therefore, the first and second members are specifically made of different materials.

The first member may be arranged to cover a portion of the second member.

With the above configuration, the first member made of a conductive inorganic material covers a portion of the second member made of an organic material, and therefore, a step is formed at a surface boundary between the first and second members. As a result, by utilizing the surface step between the first and second members, at least a portion of the top portion of each touch pin can be exposed from the alignment film.

The first member may be made of a conductive inorganic material, and the second member may be made of a conductive inorganic material different from that of the first member.

With the above configuration, the first member is made of a conductive inorganic material, and the second member is made of a conductive inorganic material different from that of the first member. Therefore, the first and second members are specifically made of different materials.

The touch pins may each have a top portion treated with fluorine coating.

With the above configuration, the top portion of each touch pin is, for example, treated with fluorine coating to an extent that avoids typical film formation (a thickness of more than 1 Å and less than 100 Å), whereby repellency to the alignment film is imparted to the top portion of the touch pin. Therefore, at least a portion of the top portion of each touch pin is exposed from the alignment film.

The touch pins may each have a top portion including a concave portion and a convex portion.

With the above configuration, the touch pins each have a top portion including a concave portion and a convex portion. The convex portion of each touch pin acts as the fulcrum of a lever, thereby reducing or preventing a permanent short circuit which is caused by the first and second touch panel interconnects sticking to each other.

The touch pins may each have a top portion including a convex portion.

With the above configuration, the convex portion protrudes from the top portion of each touch pin. The convex portion is relatively likely to repel the alignment film at the top portion of each touch pin. As a result, repellency to the alignment film is imparted to the top portion of each touch pin. Therefore, at least a portion of the top portion of each touch pin is specifically exposed from the alignment film.

The touch pins may each have a base portion made of an organic material, and the convex portion may be made of a conductive inorganic material.

With the above configuration, the convex portion is made of a conductive inorganic material, and the base portion of each touch pin is made of an organic material. Therefore, the base portion and convex portion of each touch pin are specifically made of different materials.

The convex portion may be arranged to cover a portion of the base portion.

With the above configuration, the convex portion made of a conductive inorganic material covers a portion of the base portion of each touch pin made of an organic material. Therefore, by forming a portion of a surface of the base portion into a convex shape, and utilizing the surface shape, a convex portion made of a conductive inorganic material can be formed.

The touch pins may each have a base portion made of a conductive inorganic material, and the convex portion may be made of a conductive inorganic material different from that of the base portion.

With the above configuration, the convex portion is made of a conductive inorganic material, and the base portion of each touch pin is made of a conductive inorganic material different from that of the convex portion. Therefore, the base portion and convex portion of each touch pin are specifically made of different materials.

The active matrix substrate may include a plurality of first display interconnects extending in parallel with each other, and a plurality of second display interconnects extending in parallel with each other in a direction intersecting the first display interconnects. The first touch panel interconnects may be arranged along the respective corresponding first display interconnects. The second touch panel interconnects may be arranged along the respective corresponding second display interconnects.

With the above configuration, the active matrix substrate includes a plurality of first display interconnect extending in parallel with each other, and a plurality of second display interconnect extending in parallel with each other in a direction intersecting the first display interconnects. The first touch panel interconnects are arranged along the respective corresponding first display interconnects. The second touch panel interconnects are arranged along the respective corresponding second display interconnects. Therefore, the active matrix substrate specifically includes a plurality of gate lines extending in parallel with each other, a plurality of source lines extending in parallel with each other in a direction intersecting the gate lines, and the first touch panel interconnects arranged along the gate lines or the source lines. The counter substrate specifically includes the second touch panel interconnects.

A columnar photospacer configured to determine a thickness of the liquid crystal layer may be provided on the active matrix substrate or the counter substrate.

With the above configuration, the photospacer is interposed between the active matrix substrate and the counter substrate. Therefore, when a surface of the active matrix substrate or the counter substrate is not pressed, the insulation between the first touch panel interconnects on the active matrix substrate and the second touch panel interconnects on the counter substrate is maintained by the photospacer.

A touch panel according to the present invention includes a first substrate including a plurality of first touch panel interconnects extending in parallel with each other, a second substrate facing the first substrate and including a plurality of second touch panel interconnects extending in parallel with each other in a direction intersecting the first touch panel interconnects, an intermediate layer provided between the first and second substrates with a protective film being interposed between the intermediate layer and each of the first and second substrates, and a plurality of columnar touch pins connected to the first or second touch panel interconnects. When a surface of the first or second substrate is pressed, conduction is established between at least one of the first touch panel interconnects and a corresponding at least one of the second touch panel interconnects via a corresponding at least one of the touch pins. Repellency to the protective film is imparted to at least a portion of a top portion of each of the touch pins.

With the above configuration, the first touch panel interconnects on the first substrate intersect the second touch panel interconnects on the second substrate with (the protective film/) the intermediate layer (/the protective film) being interposed therebetween. When a surface of the first or second substrate is pressed, conduction is established between at least one of the first touch panel interconnects and at least one of the second touch panel interconnects via at least one of the touch pins connected to the first or second touch panel interconnects. Therefore, a matrix type resistive touch panel is specifically implemented. Repellency to the protective film is imparted to at least a portion of the top portion of each touch pin, so that at least a portion of the top portion of each touch pin is exposed from the protective film. Therefore, the protective film does not act as a resistance component between the first and second touch panel interconnects. Therefore, in the matrix resistive touch panel, conduction can be reliably established at the top portion of the touch pin.

A display device according to the present invention includes the above touch panel and a display panel facing the touch panel.

With the above configuration, in the matrix type resistive touch panel, conduction is reliably established at the top portion of the touch pin. Therefore, the advantages of the present invention are effected in the display device including the touch panel outside the display panel.

Advantages of the Invention

According to the present invention, repellency to the alignment film or the protective film is imparted to at least a portion of the top portion of each touch pin. Therefore, in the matrix resistive touch panel, conduction can be reliably established at the top portion of the touch pin.

BRIEF DESCRIPTION OF THE DRAWINGS

FIG. 2 is a cross-sectional view of a TFT portion of an active matrix substrate 20a included in the liquid crystal display device 50a.

FIG. 3 is a cross-sectional view of a display portion of the liquid crystal display device 50a.

FIG. 4 is a cross-sectional view of a touch panel portion of the liquid crystal display device 50a.

FIG. 5 is a plan view of a counter substrate 30a of the liquid crystal display device 50a.

FIG. 6 is a diagram showing a top view (a) and a side view of a touch pin P included in the counter substrate 30a.

DESCRIPTION OF EMBODIMENTS

Embodiments of the present invention will be described in detail hereinafter with reference to the accompanying drawings. Note that the present invention is not limited to the embodiments below.

First Embodiment of the Invention

Figure 1:
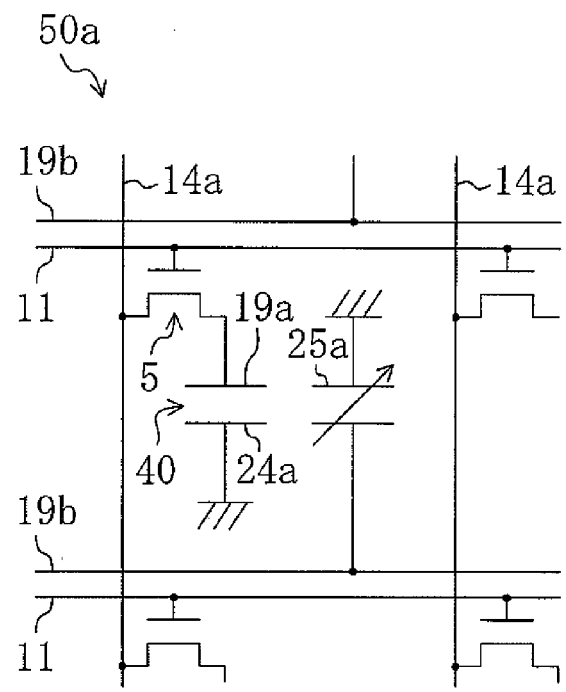
FIG. 1 is a diagram showing an equivalent circuit of a liquid crystal display device 50a according to a first embodiment.
Figure 2:
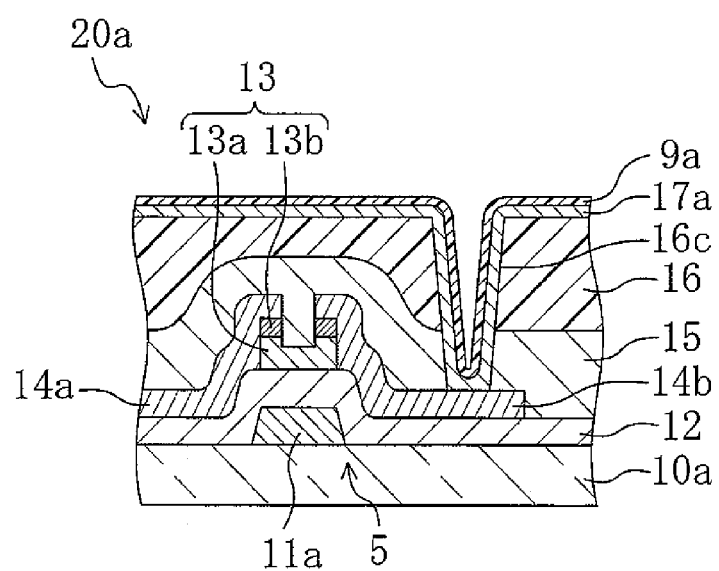
Figure 3:
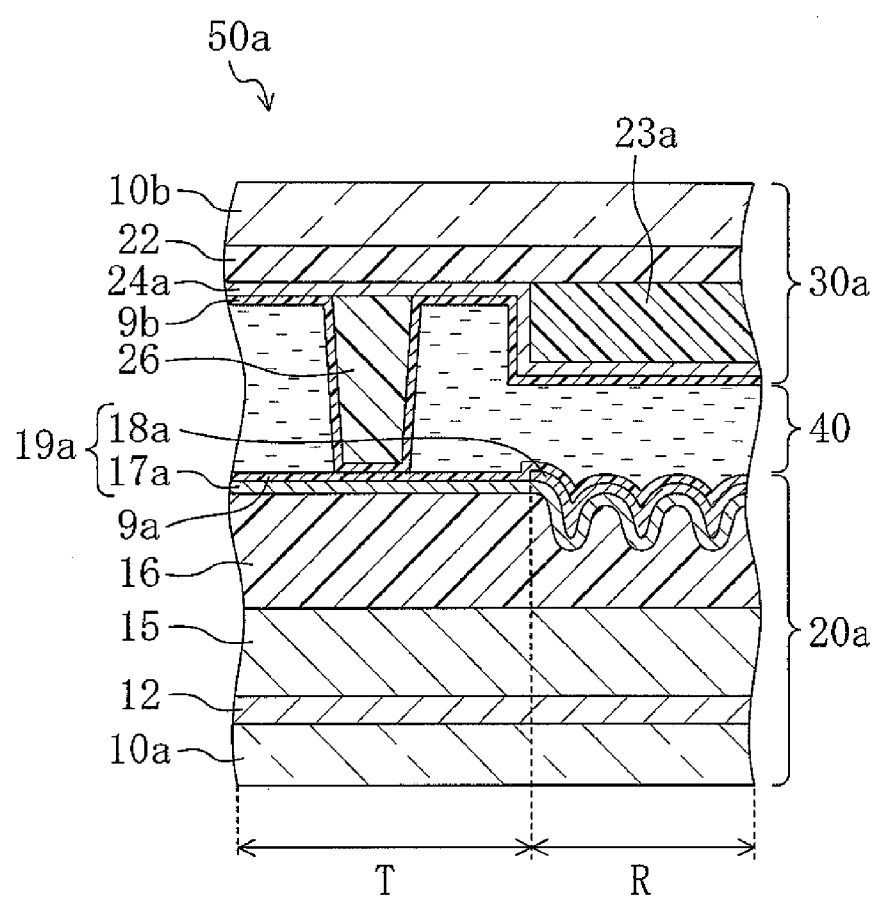
Figure 4:
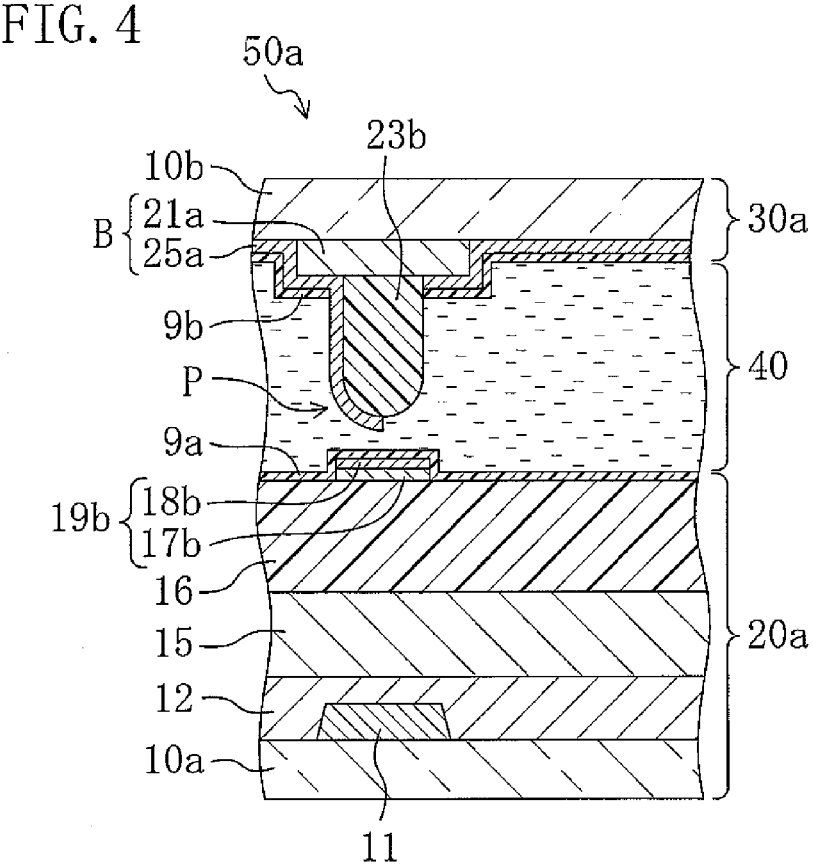
Figure 5:
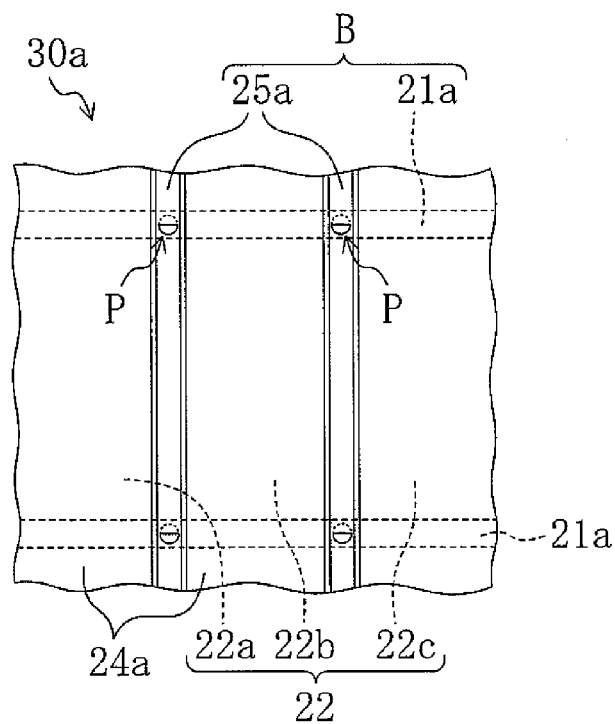
Figure 6:
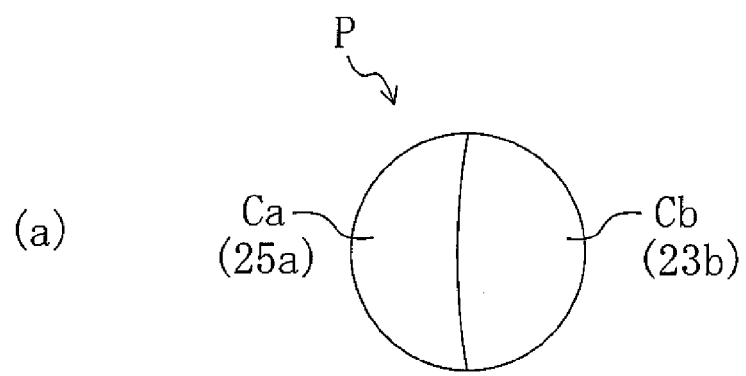
Figure 6:
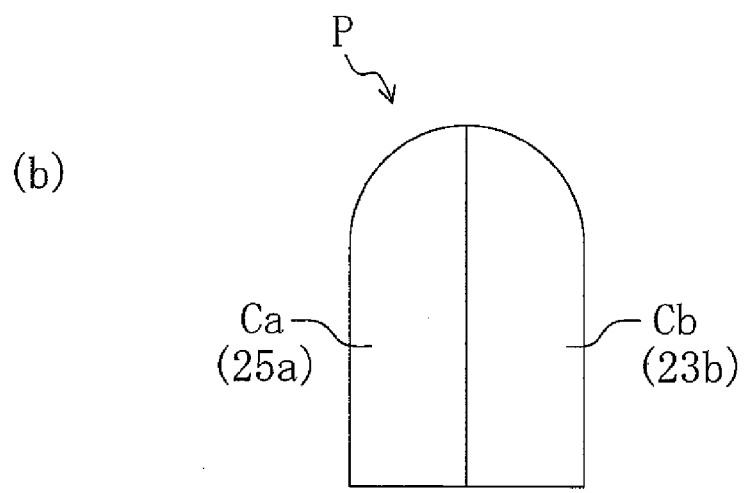

FIGS. 1-6 show a liquid crystal display device according to a first embodiment of the present invention. Specifically, FIG. 1 is a diagram showing an equivalent circuit of the liquid crystal display device 50a of this embodiment. FIG. 2 is a cross-sectional view of a TFT portion of an active matrix substrate 20a included in the liquid crystal display device 50a. FIG. 3 is a cross-sectional view of a display portion of the liquid crystal display device 50a. FIG. 4 is a cross-sectional view of a touch panel portion of the liquid crystal display device 50a. FIG. 5 is a plan view of a counter substrate 30a of the liquid crystal display device 50a. FIG. 6(a) is a top view of a touch pin P included in the counter substrate 30a, and FIG. 6(b) is a side view of the touch pin P.

As shown in FIG. 3, the liquid crystal display device 50a includes the active matrix substrate 20a and the counter substrate 30a facing each other, a liquid crystal layer 40 provided between the active matrix substrate 20a and the counter substrate 30a, and a frame-like sealing member (not shown) which bonds the active matrix substrate 20a and the counter substrate 30a to each other and encloses the liquid crystal layer 40 between the active matrix substrate 20a and the counter substrate 30a.

As shown in FIGS. 1-4, the active matrix substrate 20a includes a plurality of gate lines 11 (first display interconnects) provided on an insulating substrate 10a, such as a glass substrate etc., extending in parallel with each other, a gate insulating film 12 provided to cover the gate lines 11, a plurality of source lines 14a (second display interconnects) provided on the gate insulating film 12, extending in parallel with each other in a direction perpendicular to the gate lines 11, a plurality of TFTs 5 each provided at a corresponding one of intersections of the gate lines 11 and the source lines 14a, a first interlayer insulating film 15 and a second interlayer insulating film 16 successively provided to cover the source lines 14a and the TFTs 5, a plurality of pixel electrodes 19a arranged in a matrix on the second interlayer insulating film 16 and connected to the respective corresponding TFTs 5, a plurality of first touch panel interconnects 19b each provided between the corresponding pixel electrodes 19a and directly above the corresponding gate line 11, extending in parallel with each other, and an alignment film 9a provided to cover the pixel electrodes 19a and the first touch panel interconnects 19b. Here, in this embodiment, an interlayer insulating film including two layers, i.e., the first interlayer insulating film 15 and the second interlayer insulating film 16, has been illustrated. Alternatively, the interlayer insulating film may be a single-layer film.

As shown in FIGS. 1 and 2, the TFT 5 includes a gate electrode 11a which is a laterally extending portion of the corresponding gate line 11, the gate insulating film 12 provided to cover the gate electrode 11a, an island-like semiconductor layer 13 provided on the gate insulating film 12 and directly above the gate electrode 11a, and a source electrode (14a) and a drain electrode 14b facing each other on the semiconductor layer 13. Here, the source electrode (14a) is a laterally protruding portion of the corresponding source line 14a. As shown in FIG. 2, the drain electrode 14b is connected to a transparent electrode 17a included in the pixel electrode 19a via a contact hole 16c formed in the multilayer film including the first interlayer insulating film 15 and the second interlayer insulating film 16. As shown in FIG. 2, the semiconductor layer 13 includes an intrinsic amorphous silicon layer 13a (lower layer), and a phosphorus-doped n$^+$ amorphous silicon layer 13b (upper layer) provided on the intrinsic amorphous silicon layer 13a. The intrinsic amorphous silicon layer 13a exposed from the source electrode (14a) and the drain electrode 14b forms a channel region.

As shown in FIG. 3, the pixel electrode 19a includes the transparent electrode 17a provided on the second interlayer insulating film 16, and a reflective electrode 18a provided on the transparent electrode 17a. Here, as shown in FIG. 3, the second interlayer insulating film 16 below the pixel electrode 19a (reflective electrode 18a) has an uneven surface, and therefore, the reflective electrode 18a provided on the surface of the second interlayer insulating film 16 with the transparent electrode 17a being interposed therebetween also has an uneven surface.

As shown in FIG. 4, the first touch panel interconnect 19b includes a transparent conductive layer 17b provided on the second interlayer insulating film 16, and a reflective conductive layer 18b provided on the transparent conductive layer 17b.

As shown in FIG. 3, in the display portion of the active matrix substrate 20a and the liquid crystal display device 50a including the active matrix substrate 20a, the reflective electrode 18a determines a reflective region R, and the transparent electrode 17a exposed from the reflective electrode 18a determines a transparent region T.

As shown in FIGS. 1 and 3-5, the counter substrate 30a includes, for example, a black matrix B in the shape of a frame with a grid therein which is provided on an insulating substrate 10b, such as a glass substrate etc., and directly above the gate lines 11a (the first touch panel interconnects 19b) and the source lines 14a on the active matrix substrate 20a, a color filter 22 including a red color layer 22a, a green color layer 22b, and a blue color layer 22c provided in apertures of the black matrix B, a transparent layer 23a provided in the reflective regions R of the color filter 22 to compensate for optical path differences between the reflective regions R and the transparent regions T, a plurality of common electrodes 24a provided to cover BM lower layer portions 21a (described below) included in the black matrix B, the transparent regions T of the color filter 22, and the transparent layer 23a (the reflective regions R), a plurality of columnar photospacers 26 provided on the respective corresponding common electrodes 24a, and an alignment film 9b provided to cover the common electrodes 24a and the photospacers 26.

As shown in FIGS. 4 and 5, the black matrix B includes the BM lower layer portions 21a provided directly above the gate lines 11 (the first touch panel interconnects 19b) on the active matrix substrate 20a, and the BM upper layer portions 25a (second touch panel interconnects) provided directly above the source lines 14a on the active matrix substrate 20a.

The BM lower layer portion 21a is made of a resin, e.g., an organic insulating film in which a black pigment is dispersed.

The BM upper layer portion 25a is made of a light-shielding metal film, such as a chromium film etc., and has conductivity. As shown in FIG. 4, a convex resin layer 23b is provided below the BM upper layer portion 25a in a region where the BM upper layer portion 25a intersects the first touch panel interconnect 19b. The resin layer 23b forms a columnar touch pin P.

As shown in FIGS. 4, 6(a), and 6(b), the touch pin P has a top portion including a first member Ca and a second member Cb having a height of at least 5,000 Å, which are made of different materials.

As shown in FIGS. 4, 6(a), and 6(b), the first member Ca is a portion of the BM upper layer portion 25a and is made of a conductive inorganic material.

As shown in FIGS. 4, 6(a), and 6(b), the second member Cb is the resin layer 23b and is made of an organic material.

Here, as shown in FIGS. 4, 6(a), and 6(b), the first member Ca covers a portion of the second member Cb (the resin layer 23b), and therefore, a step is formed at a surface boundary between the first and second members Ca and Cb.

As shown in FIG. 5, the common electrodes 24a are each formed in the shape of a stripe and are each provided between the corresponding BM upper layer portions 25a, extending in parallel with each other.

The liquid crystal layer 40 is made of a nematic liquid crystal material having electro-optic characteristics, etc.

The semi-transmissive liquid crystal display device 50a thus configured is arranged so that light entering through the counter substrate 30a is reflected from the reflective electrode 18a in the reflective region R, while light from a backlight entering through the active matrix substrate 20a is transmitted in the transparent region T.

The liquid crystal display device 50a displays an image in the following manner. In each pixel, a gate signal is transferred from the gate line 11 to the gate electrode 11a, so that the TFT 5 is turned on. Thereafter, a source signal is transferred from the source line 14a to the source electrode (14a). As a result, predetermined charge is written via the semiconductor layer 13 and the drain electrode 14b to the pixel electrode 19a including the transparent electrode 17a and the reflective electrode 18a. In this case, in the liquid crystal display device 50a, a potential difference occurs between the pixel electrode 19a of the active matrix substrate 20a and the corresponding common electrode 24a of the counter substrate 30a, so that a predetermined voltage is applied to the liquid crystal layer 40. In the liquid crystal display device 50a, the alignment of the liquid crystal layer 40 is changed, depending on the magnitude of the voltage applied to the liquid crystal layer 40, to adjust the light transmittance of the liquid crystal layer 40, thereby displaying an image.

Also, in the liquid crystal display device 50a, when a surface of the active matrix substrate 20a or the counter substrate 30a is pressed, the touch pin of the BM upper layer portion 25a (second touch panel interconnect) and the first touch panel interconnect 19b contact each other to establish conduction, whereby a pressed (touch) position is detected.

Next, an example method of manufacturing the liquid crystal display device 50a of this embodiment will be described. Note that the manufacturing method of this embodiment includes an active matrix substrate fabricating step, a counter substrate fabricating step, and a substrate joining step.

<Active Matrix Substrate Fabricating Step>

Initially, for example, a titanium film, an aluminum film, and a titanium film, etc. are successively formed by sputtering on an entirety of the insulating substrate 10a, such as a glass substrate etc. Thereafter, patterning is performed by photolithography to form the gate lines 11 and the gate electrodes 11a having a thickness of about 4,000 Å.

Next, for example, a silicon nitride film etc. is formed by plasma-enhanced chemical vapor deposition (CVD) on an entirety of the substrate on which the gate lines 11 and the gate electrodes 11a have been formed, thereby forming the gate insulating film 12 having a thickness of about 4,000 Å.

Next, for example, an intrinsic amorphous silicon film (thickness: about 2,000 Å) and a phosphorus-doped $n^+$ amorphous silicon film (thickness: about 500 Å) are successively formed by plasma-enhanced CVD on an entirety of the substrate on which the gate insulating film 12 has been formed. Thereafter, patterning is performed by photolithography to form on each of the gate electrodes (11a) an island-like pattern of a semiconductor layer formation layer in which the intrinsic amorphous silicon layer and the $n^+$ amorphous silicon layer are stacked.

Thereafter, for example, an aluminum film and a titanium film, etc. are successively formed by sputtering on an entirety of the substrate on which the semiconductor layer formation layer has been formed. Thereafter, patterning is performed by photolithography to form the source lines 14a, the source electrodes (14a), and the drain electrodes 14b having a thickness of about 2,000 Å.

Next, the $n^+$ amorphous silicon layer of the semiconductor layer formation layer is etched using the source electrodes (14a) and the drain electrodes 14b as a mask to form channel regions by patterning, thereby forming the semiconductor layer 13 and the TFTs 5 including the semiconductor layer 13.

Moreover, for example, a silicon nitride film etc. is formed by plasma-enhanced CVD on an entirety of the substrate on which the TFTs 5 have been formed, thereby forming the first interlayer insulating film 15 having a thickness of about 4,000 Å.

Thereafter, for example, a positive photosensitive resin having a thickness of about 3 μm is applied by spin coating onto an entirety of the substrate on which the first interlayer insulating film 15 has been formed. The applied photosensitive resin is uniformly exposed to relatively low illuminance using a first photomask in which a plurality of circular light shielding portions are separately and randomly formed, and then uniformly exposed to relatively high illuminance using a second photomask in which openings are formed at positions corresponding to the contact holes 16c on the drain electrodes 14b, followed by development. As a result, the portions exposed to the high illuminance of the photosensitive resin are completely removed, while the portions exposed to the low illuminance of the photosensitive resin are left with a thickness of about 40% of the applied thickness. The unexposed portions of the photosensitive resin are left with a thickness of about 80% of the applied thickness. Moreover, the substrate with the developed photosensitive resin is heated to about 200° C., to melt the photosensitive resin, thereby forming the second interlayer insulating film 16 having a smooth and corrugated surface in each reflective region R. Thereafter, the first interlayer insulating film 15 exposed from the second interlayer insulating film 16 is etched to form the contact holes 16c.

Next, a transparent conductive film made of an indium tin oxide (ITO) film etc. is formed by sputtering on an entirety of the substrate on which the second interlayer insulating film 16 has been formed. Thereafter, patterning is performed by photolithography to form the transparent electrodes 17a and the transparent conductive layer 17b having a thickness of about 1,000 Å.

Moreover, a molybdenum film (thickness: about 750 Å) and an aluminum film (thickness: about 1,000 Å) are successively formed by sputtering on an entirety of the substrate on which the transparent electrodes 17a and the transparent conductive layer 17b have been formed. Thereafter, patterning is performed by photolithography to form the reflective electrodes 18a and the reflective conductive layer 18b. As a result, the pixel electrodes 19a including the transparent electrodes 17a and the reflective electrodes 18a, and the first touch panel interconnects 19b including the transparent conductive layer 17b and the reflective conductive layer 18b, are formed.

Finally, a polyimide resin is applied by a printing technique onto an entirety of the substrate on which the pixel electrodes 19a and the first touch panel interconnects 19b have been formed. Thereafter, a rubbing treatment is performed to form the alignment film 9a having a thickness of about 1,000 Å.

Thus, the active matrix substrate 20a can be fabricated.

<Counter Substrate Fabricating Step>

Initially, for example, an acrylic photosensitive resin in which a black pigment, such as carbon particles etc., is dispersed is applied by spin coating onto an entirety of the insulating substrate 10b, such as a glass substrate etc. The applied photosensitive resin is exposed using a photomask and then developed to perform patterning, thereby forming the BM lower layer portions 21a having a thickness of about 2.0 μm.

Next, an acrylic photosensitive resin is applied by spin coating onto an entirety of the substrate on which the BM lower layer portions 21a have been formed. The applied photosensitive resin is exposed using a photomask and then developed and heated to form the resin layer 23b having a thickness of about 2.0 μm.

Moreover, for example, a chromium film is formed by sputtering on an entirety of the substrate on which the resin layer 23b has been formed. Thereafter, patterning is performed by photolithography to form the BM upper layer portions 25a having a thickness of about 2,000 Å.

Next, for example, a red-, green-, or blue-colored acrylic photosensitive resin is applied onto the substrate on which the BM upper layer portions 25a have been formed. The applied photosensitive resin is exposed using a photomask and then developed to perform patterning, thereby forming a color layer with a selected color (for example, the red color layer 22a) having a thickness of about 2.0 μm. Moreover, by repeating a similar process for the two other colors, color layers with the two other colors (for example, the green color layer 22b and the blue color layer 22c) having a thickness of about 2.0 μm are formed. As a result, the color filter 22 including the red color layer 22a, the green color layer 22b, and the blue color layer 22c is formed.

Moreover, an acrylic photosensitive resin is applied by spin coating onto the substrate on which the color filter 22 has been formed. The applied photosensitive resin is exposed using a photomask and then developed to form the transparent layer 23a having a thickness of about 2 μm.

Thereafter, for example, an ITO film is formed by sputtering on an entirety of the substrate on which the transparent layer 23a has been formed. Thereafter, patterning is performed by photolithography to form the common electrodes 24a having a thickness of about 1,500 Å.

Moreover, an acrylic photosensitive resin is applied by spin coating onto an entirety of the substrate on which the common electrodes 24a have been formed. The applied photosensitive resin is exposed using a photomask and then developed to form the photospacers 26 having a thickness of about 4 μm.

Finally, a polyimide resin is applied by a printing technique onto an entirety of the substrate on which the photospacers 26 have been formed. Thereafter, a rubbing treatment is performed to form the alignment film 9b having a thickness of about 1,000 Å. In this case, a top portion of each touch pin P includes the first and second members Ca and Cb made of different materials, and has a surface step at a boundary between the first and second members Ca and Cb. Therefore, the top portion of each touch pin P has a portion which is relatively likely to repel the alignment film. As a result, at least a portion of the top portion of each touch pin P is exposed from the alignment film 9b.

Thus, the counter substrate 30a can be fabricated.

<Substrate Joining Step>

Initially, for example, a frame-like sealing member made of an ultraviolet and thermal curing resin etc. is applied (drawn), using a dispenser, onto the counter substrate 30a which has been fabricated in the counter substrate fabricating step.

Next, a liquid crystal material is dropped into a region inside the sealing member of the counter substrate 30a on which the sealing member has been applied (drawn).

Moreover, the counter substrate 30a on which the liquid crystal material has been dropped, and the active matrix substrate 20a which has been formed in the active matrix substrate fabricating step, are joined with each other under reduced pressure. The counter substrate 30a and the active matrix substrate 20a thus joined with each other are exposed to the atmosphere so that pressure is applied on the outer surfaces of the counter substrate 30a and the active matrix substrate 20a.

Finally, the sealing member interposed between the counter substrate 30a and the active matrix substrate 20a which have been joined with each other is irradiated with UV light and then heated, whereby the sealing member is cured.

Thus, the liquid crystal display device 50a can be fabricated.

As described above, according to the liquid crystal display device 50a of this embodiment, the first touch panel interconnects 19b on the active matrix substrate 20a and the BM upper layer portions 25a serving as the second touch panel interconnects on the counter substrate 30a intersect with the alignment film 9a/the liquid crystal layer 40/the alignment film 9b being interposed therebetween. When a surface of the active matrix substrate 20a or the counter substrate 30a is pressed, conduction is established between at least one of the first touch panel interconnects 19b and at least one of the BM upper layer portions 25a via at least one of the touch pins connected to the BM upper layer portions 25a. Thus, a matrix type resistive touch panel is incorporated in a liquid crystal display device. The top portion of each touch pin P has the first member Ca made of a conductive inorganic material and the second member Cb made of an organic material. The first and second members Ca and Cb having different repellencies (less repellent/more repellent) specific to the respective materials with respect to the alignment film 9b. Therefore, at least a portion of the top portion of each touch pin P has repellency to the alignment film 9b, and therefore, is exposed from the alignment film 9b. As a result, the alignment film 9b does not act as a resistance component between the first touch panel interconnect 19b and the BM upper layer portion 25a. Therefore, in the matrix type resistive touch panel incorporated in the liquid crystal display device, conduction can be reliably established at the top portion of the touch pin P.

Also, according to the liquid crystal display device 50a of this embodiment, the first member Ca made of a conductive inorganic material covers a portion of the second member Cb made of an organic material, and therefore, a step is formed at a surface boundary between the first and second members Ca and Cb. As a result, by utilizing the surface step between the first and second members Ca and Cb, at least a portion of the top portion of each touch pin P can be exposed from the alignment film 9b.

Also, according to the liquid crystal display device 50a of this embodiment, the photospacers 26 are interposed between the active matrix substrate 20a and the counter substrate 30a. Therefore, when a surface of the active matrix substrate 20a or the counter substrate 30a is not pressed, the insulation between the first touch panel interconnects 19b on the active matrix substrate 20a and the BM upper layer portions 25a on the counter substrate 30a can be maintained by the photospacers 26.

Note that, in this embodiment, the top portion of the touch pin P including the first member Ca made of a conductive inorganic material (chromium film) and the second member Cb made of an organic material has been illustrated. Alternatively, the second member Cb may be, for example, made of a conductive inorganic material, such as a multilayer film including an aluminum film and a molybdenum film, etc., which is different from the material of the first member Ca. Alternatively, the first member Ca may be made of an ITO film forming the common electrodes 24a, etc. Moreover, the first and second members Ca and Cb may be made of different organic materials.

Second Embodiment of the Invention

Figure 7:
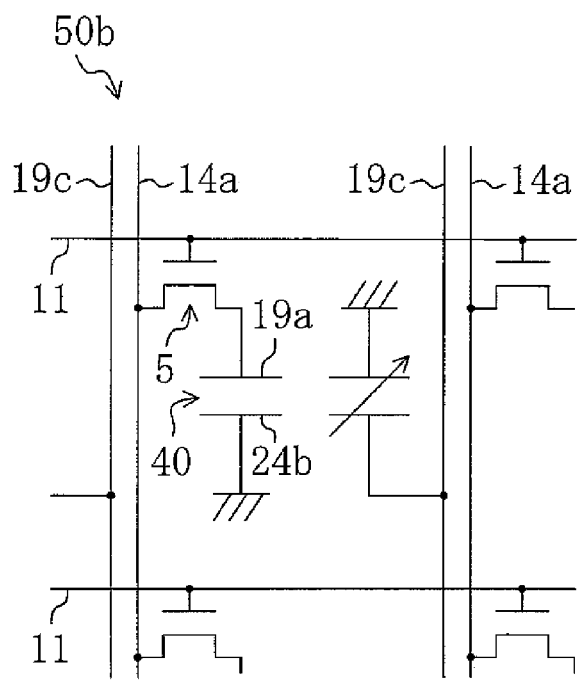
FIG. 7 is a diagram showing an equivalent circuit of a liquid crystal display device 50b according to a second embodiment.
Figure 8:
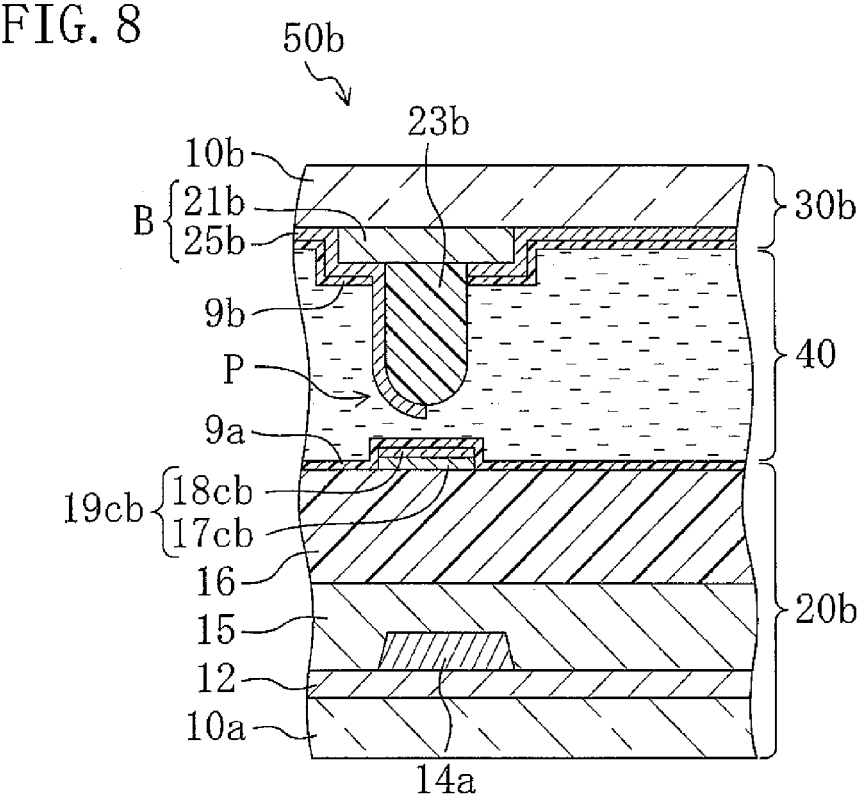
FIG. 8 is a cross-sectional view of a touch panel portion of the liquid crystal display device 50b.
Figure 9:
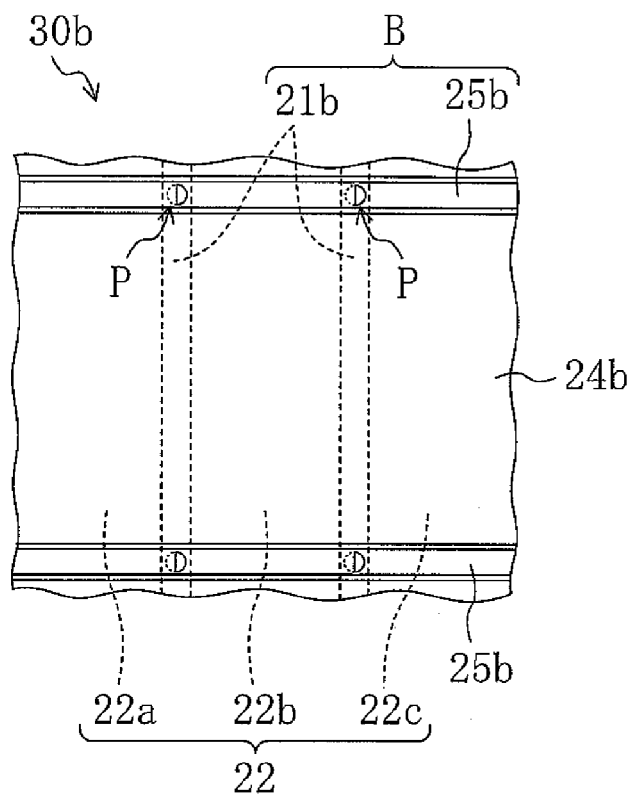
FIG. 9 is a plan view of a counter substrate 30b of the liquid crystal display device 50b.

FIGS. 7-9 show a liquid crystal display device according to a second embodiment of the present invention. Specifically, FIG. 7 is a diagram showing an equivalent circuit of the liquid crystal display device 50b of this embodiment. FIG. 8 is a cross-sectional view of a touch panel portion of the liquid crystal display device 50b. FIG. 9 is a plan view of a counter substrate 30b of the liquid crystal display device 50b. Note that, in embodiments described below, the same parts as those of FIGS. 1-6 are indicated by the same reference characters, and detailed description thereof will be omitted.

While the first display interconnects are gate lines and the second display interconnects are source lines in the liquid crystal display device 50a of the first embodiment, the first display interconnects are source lines and the second display interconnects are gate lines in the liquid crystal display device 50b of this embodiment.

As shown in FIG. 8, the liquid crystal display device 50b includes an active matrix substrate 20b and a counter substrate 30b facing each other, a liquid crystal layer 40 interposed between the active matrix substrate 20b and the counter substrate 30b, and a frame-like sealing member (not shown) which bonds the active matrix substrate 20b and the counter substrate 30b to each other and encloses the liquid crystal layer 40 between the active matrix substrate 20b and the counter substrate 30b.

As shown in FIGS. 7 and 8, the active matrix substrate 20b includes a plurality of gate lines 11 (second display interconnects) provided on an insulating substrate 10a, such as a glass substrate etc., extending in parallel with each other, a gate insulating film 12 provided to cover the gate lines 11, a plurality of source lines 14a (first display interconnects) provided on the gate insulating film 12, extending in parallel with each other in a direction perpendicular to the gate lines 11, a plurality of TFTs 5 each provided at a corresponding one of intersections of the gate lines 11 and the source lines 14a, a first interlayer insulating film 15 and a second interlayer insulating film 16 successively provided to cover the source lines 14a and the TFTs 5, a plurality of pixel electrodes 19a arranged in a matrix on the second interlayer insulating film 16 and connected to the respective corresponding TFTs 5, a plurality of first touch panel interconnects 19cb each provided between the corresponding pixel electrodes 19a, extending in parallel with each other in a direction along the source lines 14a, and an alignment film 9a provided to cover the pixel electrodes 19a and the first touch panel interconnects 19cb.

As shown in FIG. 8, the first touch panel interconnect 19cb includes a transparent conductive layer 17cb which is formed on the second interlayer insulating film 16 at the same time when transparent electrodes 17a are formed, and a reflective conductive layer 18cb which is formed on the transparent conductive layer 17cb at the same time when reflective electrodes 18a are formed.

As shown in FIGS. 7-9, the counter substrate 30b includes, for example, a black matrix B in the shape of a frame with a grid therein which is provided on an insulating substrate 10b, such as a glass substrate etc., and directly above the gate lines 11a and the source lines 14a (the first touch panel interconnects 19cb) on the active matrix substrate 20b, a color filter 22 including a red color layer 22a, a green color layer 22b, and a blue color layer 22c provided in apertures of the black matrix B, a transparent layer 23a provided in the regions R of the color filter 22 to compensate for optical path differences between the reflective regions R and the transparent regions T, a plurality of common electrodes 24b provided to cover BM lower layer portions 21b (described below) included in the black matrix B, the transparent regions T of the color filter 22, and the transparent layer 23a (the reflective regions R), a plurality of columnar photospacers 26 provided on the respective corresponding common electrodes 24b, and an alignment film 9b provided to cover the common electrodes 24b, and the photospacers 26.

As shown in FIGS. 8 and 9, the black matrix B includes the BM lower layer portions 21b provided directly above the source lines 14a (the first touch panel interconnects 19cb) on the active matrix substrate 20b, and the BM upper layer portions 25b (second touch panel interconnects) provided directly above the gate lines 11 on the active matrix substrate 20b.

The BM lower layer portion 21b is made of a resin, e.g., an organic insulating film in which a black pigment is dispersed.

The BM upper layer portion 25b is made of a light-shielding metal film, such as a chromium film etc., and has conductivity. Also, as shown in FIG. 8, a convex resin layer 23b is provided below the BM upper layer portion 25b in a region where the BM upper layer portion 25b intersects the first touch panel interconnect 19cb. The resin layer 23b forms the columnar second touch pin P.

As shown in FIG. 8, the top portion of the touch pin P includes the first and second members Ca and Cb made of different materials.

As shown in FIG. 8, the first member Ca is a portion of the BM upper layer portion 25b and is made of the conductive inorganic material.

As shown in FIG. 8, the second member Cb is the resin layer 23b and is made of the organic material.

Here, as shown in FIG. 8, the first member Ca covers a portion of the second member Cb (the resin layer 23b), and therefore, a step is formed at a surface boundary between the first and second members Ca and Cb.

As shown in FIG. 9, the common electrodes 24b are each formed in the shape of a stripe and are each provided between the corresponding BM upper layer portions 25b, extending in parallel with each other.

The semi-transmissive liquid crystal display device 50b thus configured is arranged so that light entering through the counter substrate 30b is reflected from the reflective electrode 18a in the reflective region R, while light from a backlight entering through the active matrix substrate 20b is transmitted in the transparent region T.

The liquid crystal display device 50b displays an image in the following manner. In each pixel, a gate signal is transferred from the gate line 11 to the gate electrode 11a, so that the TFT 5 is turned on. Thereafter, a source signal is transferred from the source line 14a to the source electrode (14a). As a result, predetermined charge is written via the semiconductor layer 13 and the drain electrode 14b to the pixel electrode 19a including the transparent electrode 17a and the reflective electrode 18a. In this case, in the liquid crystal display device 50b, a potential difference occurs between the pixel electrode 19a of the active matrix substrate 20b and the corresponding common electrode 24b of the counter substrate 30b, so that a predetermined voltage is applied to the liquid crystal layer 40. In the liquid crystal display device 50b, the alignment of the liquid crystal layer 40 is changed, depending on the magnitude of the voltage applied to the liquid crystal layer 40, to adjust the light transmittance of the liquid crystal layer 40, thereby displaying an image.

Also, in the liquid crystal display device 50b, when a surface of the active matrix substrate 20b or the counter substrate 30b is pressed, the touch pin P of the BM upper layer portion 25b (second touch panel interconnect) and the first touch panel interconnect 19cb contact each other to establish conduction, whereby a pressed (touch) position is detected.

Note that the liquid crystal display device 50b of this embodiment can be fabricated by the active matrix fabricating step and the counter substrate fabricating step described in the first embodiment where the patterns of the constituent thin films are changed.

As described above, according to the liquid crystal display device 50b of this embodiment, as in the first embodiment, the alignment film 9b does not act as a resistance component between the first touch panel interconnect 19cb and the BM upper layer portion 25b. As a result, conduction can be reliably established at the top portions of the touch pins P in the matrix type resistive touch panel incorporated in the liquid crystal display device.

Third Embodiment of the Invention

Figure 10:
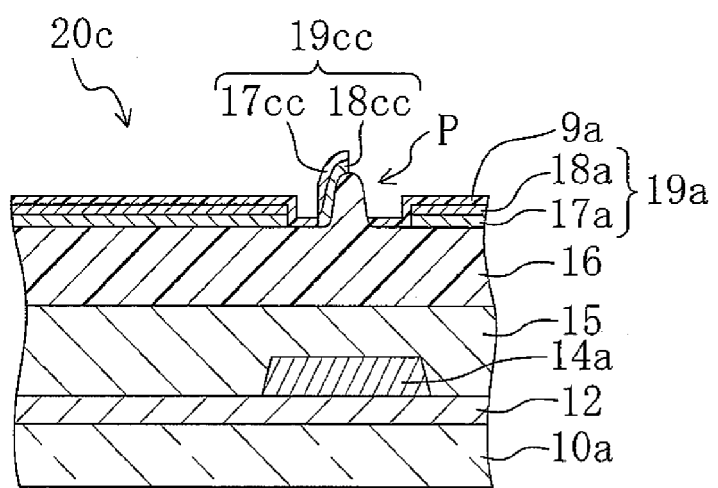
FIG. 10 is a cross-sectional view of an active matrix substrate 20c included in a liquid crystal display device according to a third embodiment.

FIG. 10 is a cross-sectional view of an active matrix substrate 20c included in a liquid crystal display device according to this embodiment.

Although the touch pins P is provided on the counter substrates 30a and 30b in the liquid crystal display devices 50a and 50b of the first and second embodiments, respectively, touch pins P are also provided not only on the counter substrate, but also on the active matrix substrate 20c in the liquid crystal display device of this embodiment.

Specifically, the liquid crystal display device of this embodiment includes the active matrix substrate 20c, the counter substrate 30b of the second embodiment facing the active matrix substrate 20c, a liquid crystal layer 40 provided between the active matrix substrate 20c and the counter substrate 30b, and a frame-like sealing member (not shown) which bonds the active matrix substrate 20c and the counter substrate 30b to each other and encloses the liquid crystal layer 40 between the active matrix substrate 20c and the counter substrate 30b.

As shown in FIG. 10, on the active matrix substrate 20c, first touch panel interconnects 19cc are provided between corresponding ones of a plurality of pixel electrodes 19a arranged in a matrix on a second interlayer insulating film 16, extending in a direction along source lines 14a. Here, as shown in FIG. 10, the first touch panel interconnect 19cc includes a transparent conductive layer 17cc which is formed on the second interlayer insulating film 16 at the same time when transparent electrodes 17a are formed, and a reflective conductive layer 18cc which is formed on the transparent conductive layer 17cc at the same time when reflective electrodes 18a are formed. A surface of the second interlayer insulating film 16 below the first touch panel interconnect 19cc is partially formed in a convex shape. The convex surface of the second interlayer insulating film 16 forms a touch pin P. By utilizing a halftone mask etc., the second interlayer insulating film 16 is formed so that the convex portion below the first touch panel interconnect 19cc protrudes higher than a convex one of convex and concave portions below the pixel electrode 19a (the reflective electrode 18a).

In the liquid crystal display device of this embodiment, when a surface of the active matrix substrate 20c or the counter substrate 30b is pressed, the touch pin P of the BM upper layer portion 25b of the counter substrate 30b and the touch pin P of the first touch panel interconnect 19cc on the active matrix substrate 20c contact each other, whereby a pressed (touch) position is detected.

According to the liquid crystal display device of this embodiment, as in the first and second embodiments, the alignment films 9a and 9b do not act as resistance components between the first touch panel interconnect 19cc and the BM upper layer portion 25b. Therefore, in the matrix type resistive touch panel incorporated in the liquid crystal display device, conduction can be reliably established at the top portion of the touch pin P.

Fourth Embodiment of the Invention

Figure 11:
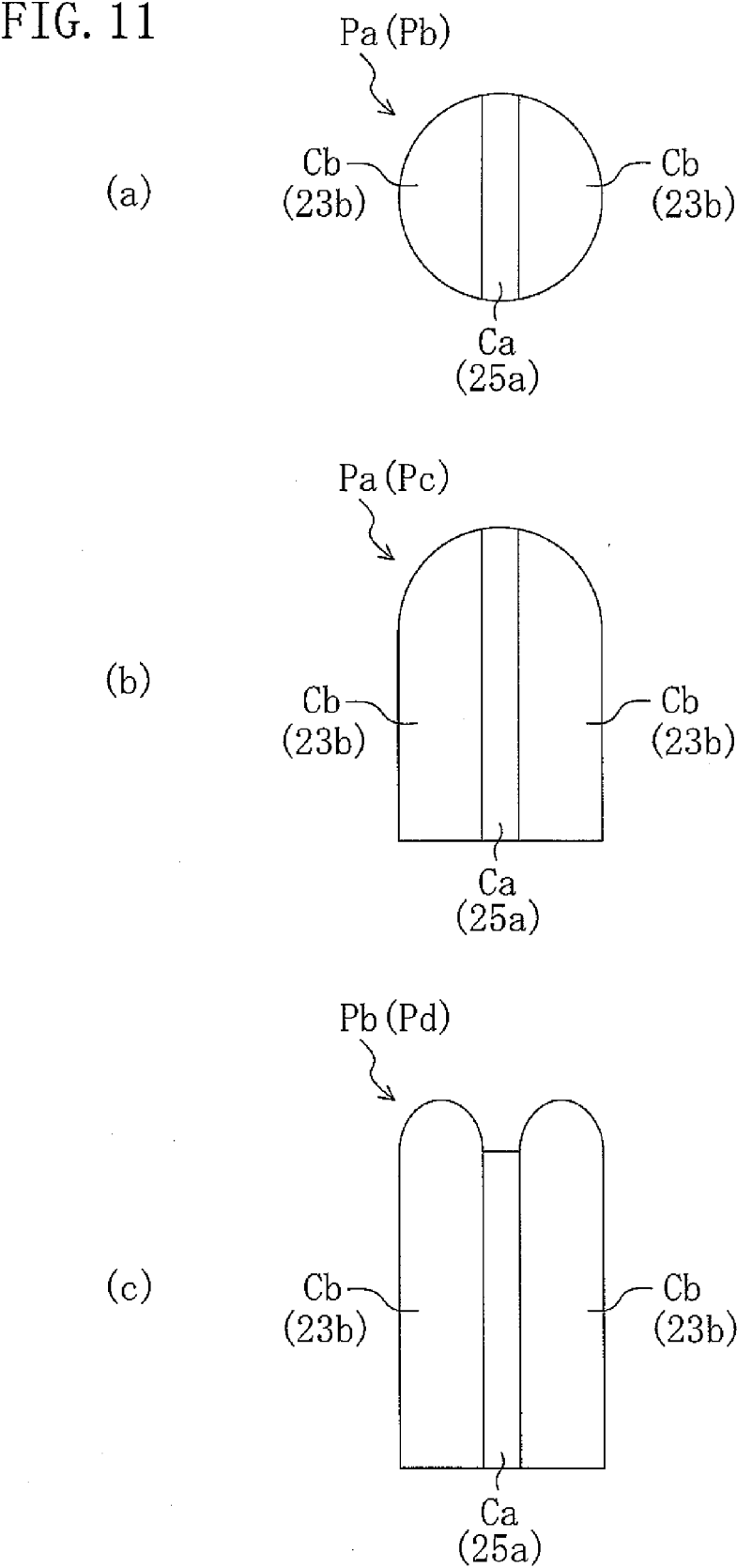
FIG. 11 is a diagram showing a top view (a) and a side view (b) of a touch pin Pa included in a liquid crystal display device according to a fourth embodiment, and a side view (c) of a touch pin Pb included in the liquid crystal display device.
Figure 12:
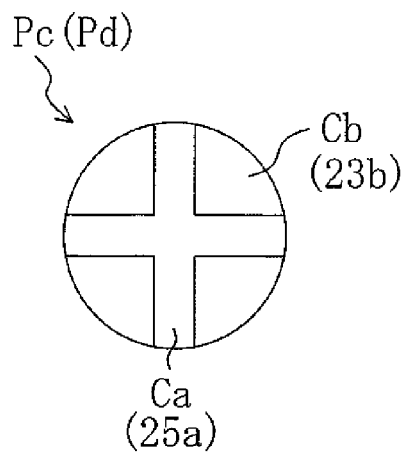
FIG. 12 is a top view of a touch pin Pc included in the liquid crystal display device of the fourth embodiment.

FIG. 11 shows a top view (a) and a side view (b) of a touch pin Pa included in a liquid crystal display device according to this embodiment, and a side view (c) of a touch pin Pb included in the liquid crystal display device. FIG. 12 shows a top view of a touch pin Pc included in the liquid crystal display device.

In the liquid crystal display devices of the above embodiments, the touch pin P includes the first member Ca in one of the regions which are halves of the hemisphere of the top portion separated by substantially a center line, and the second member Cb in the other region. Alternatively, touch pins Pa, Pb, Pc, and Pd having other structures described below may be used.

As shown in FIGS. 11(a) and 11(b), the touch pin Pa includes a linear first member Ca extending through an apex of the touch pin Pa, and a second member Cb provided on opposite sides of the first member Ca.

As shown in FIGS. 11(a) and 11(c), the touch pin Pb includes a linear first member Ca extending through a center of the touch pin Pb, and a convex second member Cb provided on opposite sides of the first member Ca.

As shown in FIGS. 12 and 11(b), the touch pin Pc includes a cross-like first member Ca extending through an apex of the touch pin Pc, and a second member Cb provided between intersecting lines of the first member Ca.

As shown in FIGS. 12 and 11(c), the touch pin Pd includes a cross-like first member Ca extending through a center of the touch pin Pd, and a convex second member Cb provided between intersecting lines of the first member Ca.

The top portion of each of the touch pins Pb and Pd has a concave portion and a convex portion. The convex portion (the second member Cb) acts as the fulcrum of a lever, thereby reducing or preventing a permanent short circuit which is caused by the first and second touch panel interconnects sticking to each other.

According to the liquid crystal display device of this embodiment, as in the first to third embodiments, the alignment film does not act as a resistance component between the first and second touch panel interconnects. Therefore, in the matrix type resistive touch panel incorporated in the liquid crystal display device, conduction can be reliably established at the top portion of the touch pin P.

Fifth Embodiment of the Invention

Figure 13:
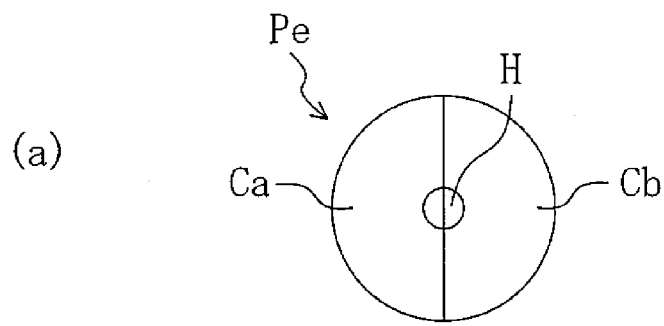
FIG. 13 is a diagram showing a top view (a) and a side view (b) of a touch pin Pe included in a liquid crystal display device according to a fifth embodiment.
Figure 13:
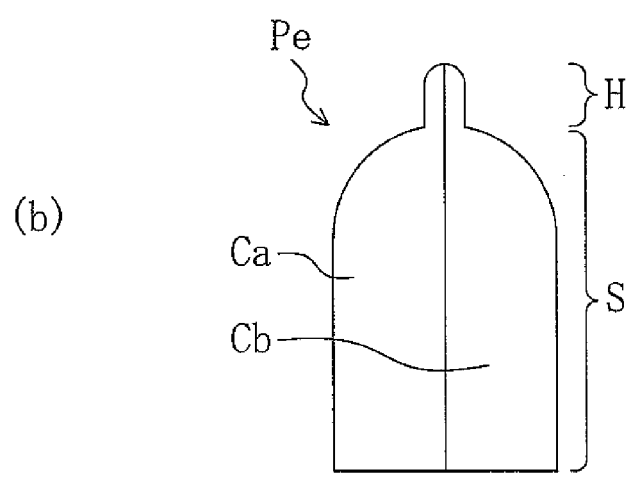
Figure 14:
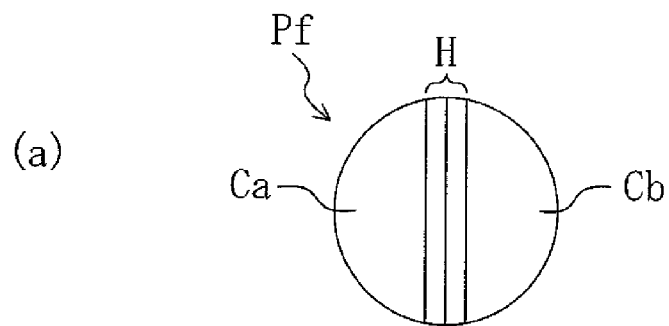
FIG. 14 is a diagram showing a top view (a) and side views (b) and (c) of a touch pin Pf included in the liquid crystal display device of the fifth embodiment.
Figure 14:
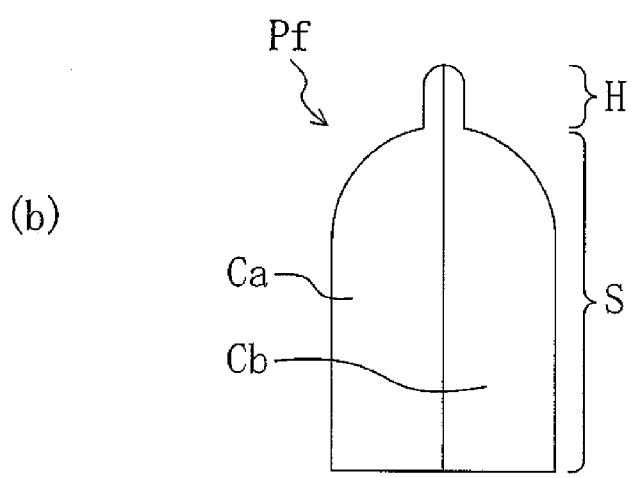
Figure 14:
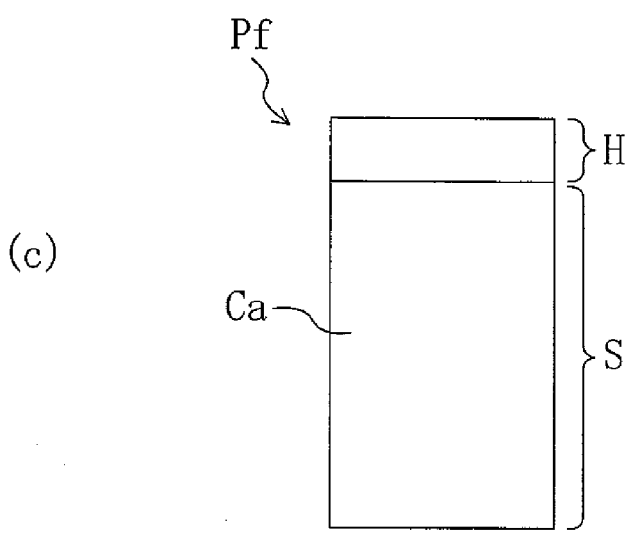
Figure 15:
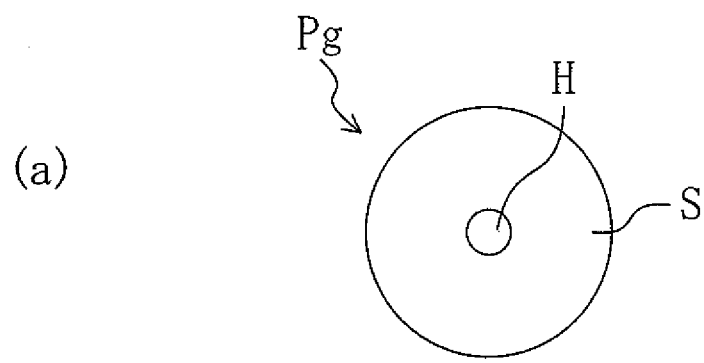
FIG. 15 is a diagram showing a top view (a) and a side view (b) of a touch pin Pg included the liquid crystal display device of the fifth embodiment.
Figure 15:
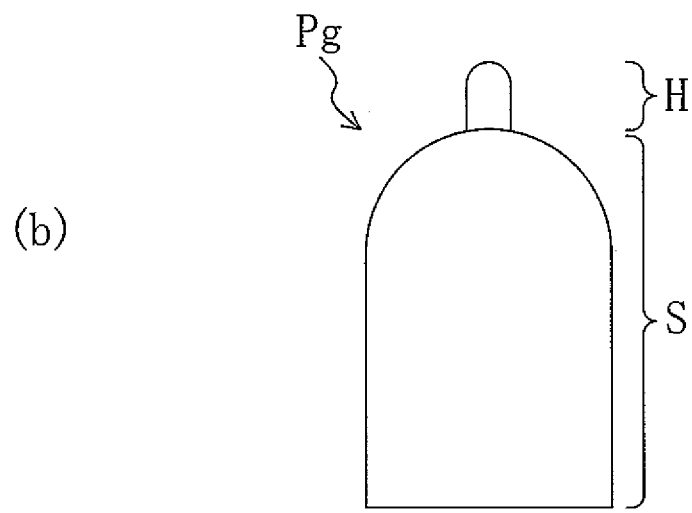
Figure 16:
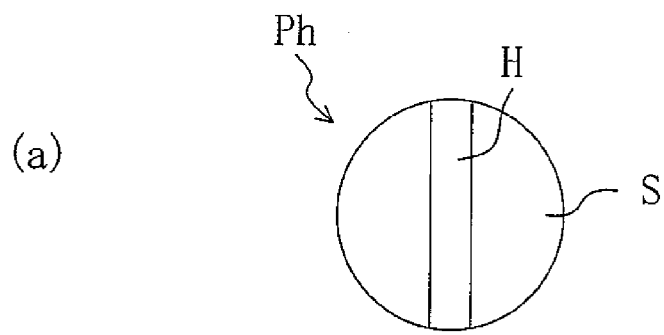
FIG. 16 is a diagram showing a top view (a) and side views (b) and (c) of a touch pin Ph included the liquid crystal display device of the fifth embodiment.
Figure 16:
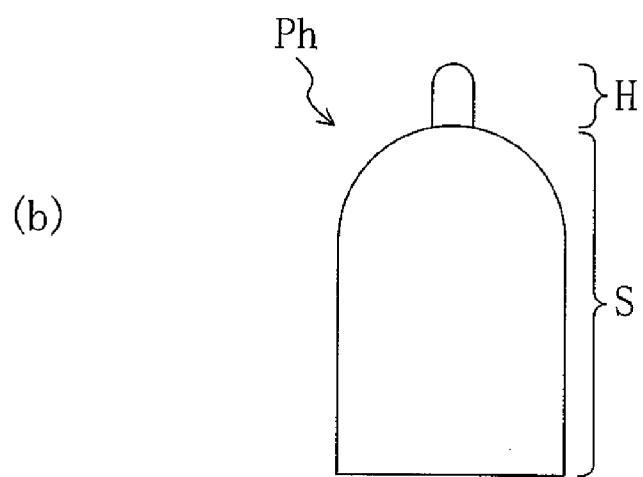
Figure 16:
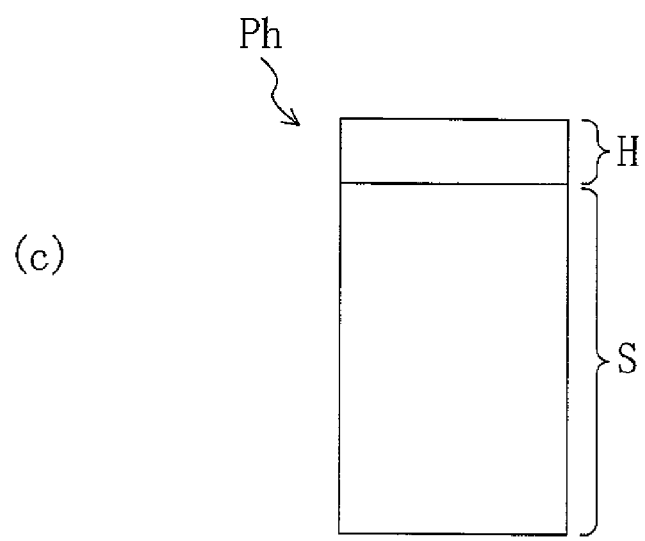
Figure 17:
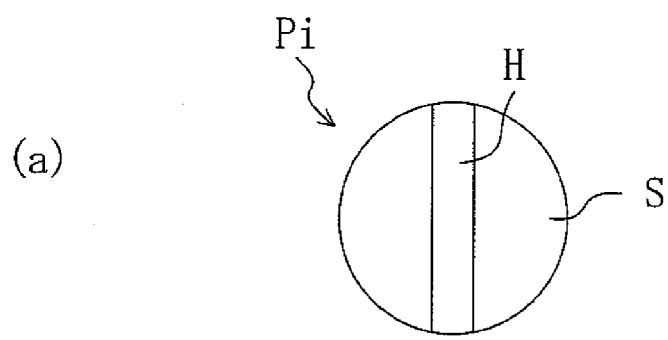
FIG. 17 is a diagram showing a top view (a) and side views (b) and (c) of a touch pin Pi included the liquid crystal display device of the fifth embodiment.
Figure 17:
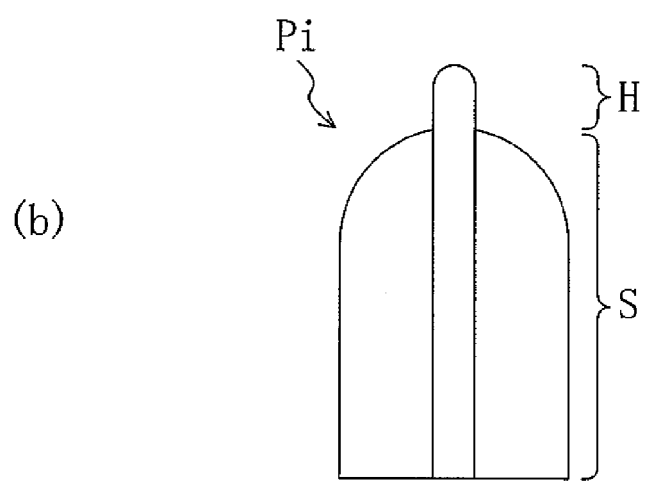
Figure 17:
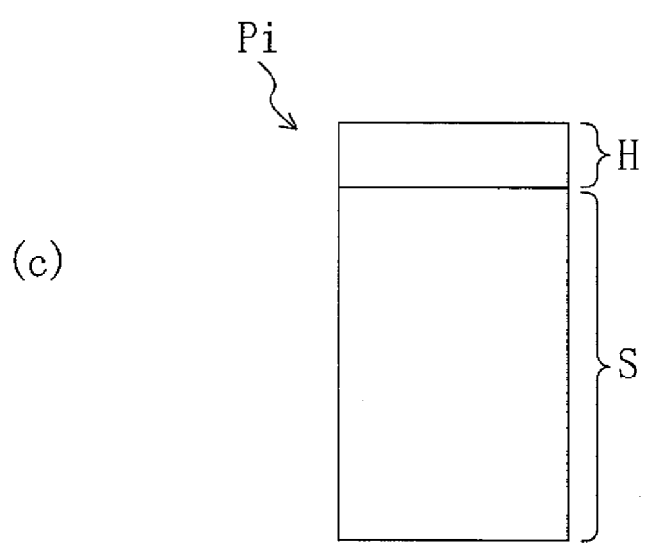

FIG. 13 shows a top view (a) and a side view (b) of a touch pin Pe included in a liquid crystal display device according to this embodiment. FIG. 14 shows a top view (a) and side views (b) and (c) of a touch pin Pf included in the liquid crystal display device of this embodiment. FIG. 15 shows a top view (a) and a side view (b) of a touch pin Pg included in the liquid crystal display device of this embodiment. FIG. 16 shows a top view (a) and side views (b) and (c) of a touch pin Ph included in the liquid crystal display device of this embodiment. FIG. 17 shows a top view (a) and side views (b) and (c) of a touch pin Pi included in the liquid crystal display device of this embodiment. Note that, in FIGS. 14, 16, and 17, the side views (b) and (c) are taken in directions perpendicular to each other.

In the liquid crystal display devices of the first to third embodiments, the touch pin P having a hemispherical top portion has been illustrated. Alternatively, the touch pins Pe, Pf, Pg, Ph, and Pi having other structures described below, etc. may be used.

As shown in FIGS. 13(a) and 13(b), the touch pin Pe includes a columnar base portion S including a first member Ca and a second member Cb, and a convex portion H protruding from an apex of the base portion S. Here, the touch pin Pe is the touch pin P of FIGS. 6(a) and 6(b) whose top portion has a protruding portion.

As shown in FIGS. 14(a), 14(b), and 14(c), the touch pin Pf has the convex portion H of FIGS. 13(a) and 13(b) which has a linear shape.

As shown in FIGS. 15(a) and 15(b), the touch pin Pg has a base portion S made of a conductive inorganic material and a convex portion H made of a conductive inorganic material different from that of the base portion S and protruding from an apex of the base portion S. Note that the base portion S and the convex portion H may be made of different organic materials.

As shown in FIGS. 16(a), 16(b), and 16(c), the touch pin Ph includes the convex portion H of FIGS. 15(a) and 15(b) which has a linear shape.

As shown in FIGS. 17(a), 17(b), and 17(c), the touch pin Pi has a base portion S made of an organic material and a convex portion H made of a conductive inorganic material and protruding from an apex of the base portion S. Here, the inorganic material forming the convex portion H covers a portion of a side wall of the base portion S.

According to the liquid crystal display device of this embodiment, as in the first to third embodiments, the convex portion H is exposed from the alignment film, and therefore, the alignment film does not act as a resistance component between the first and second touch panel interconnects. Therefore, in the matrix type resistive touch panel incorporated in the liquid crystal display device, conduction can be reliably established at the top portion of the touch pin P.

While one touch panel interconnect is provided for each display interconnect (a gate line or a source line) in the above embodiments, the present invention may also be applicable when one touch panel interconnect is provided for a plurality of adjacent display interconnects, i.e., the touch panel interconnects may be thinned out to reduce the number thereof.

While the first touch panel interconnects and the pixel electrodes 19a are simultaneously formed in the above embodiments, the first touch panel interconnects may be formed at the same time when the gate lines or the source lines are formed in the present invention.

While the touch pin is provided at least on the second touch panel interconnect in the above embodiments, the touch pin may be provided only on the first touch panel interconnect in the present invention.

Sixth Embodiment of the Invention

Figure 18:
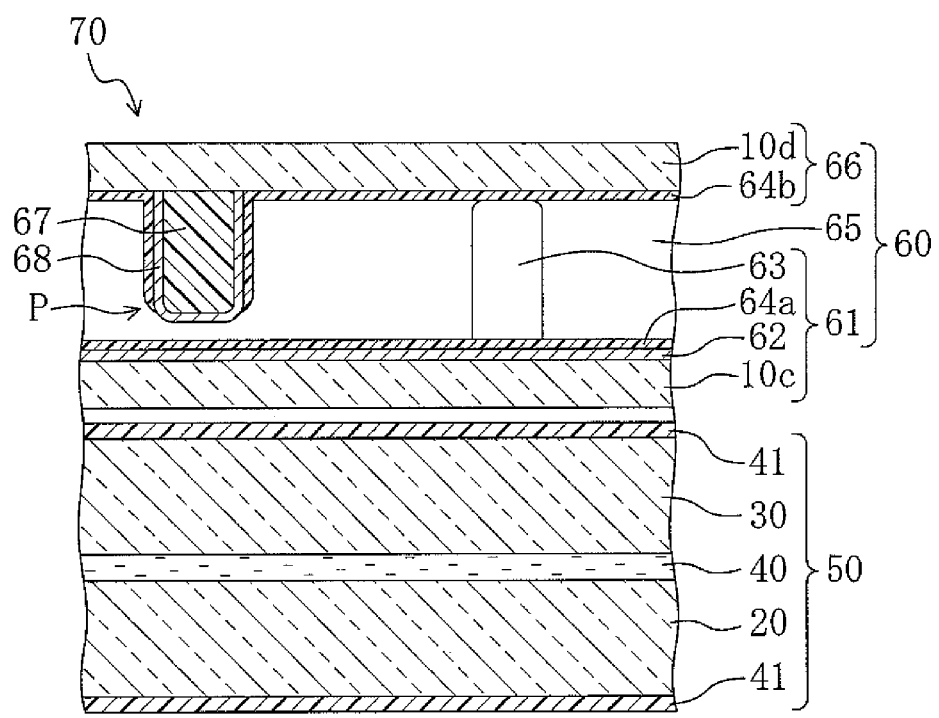
FIG. 18 is a cross-sectional view of a liquid crystal display device 70 according to a sixth embodiment.

FIG. 18 is a cross-sectional view of a liquid crystal display device 70 according to this embodiment.

While a matrix type resistive touch panel is incorporated in the liquid crystal display device of each of the above embodiments, a matrix type resistive touch panel 60 is mounted on a front surface of a liquid crystal display panel 50 in the liquid crystal display device 70 of this embodiment.

As shown in FIG. 18, the liquid crystal display device 70 includes the liquid crystal display panel 50 in which a polarizing plate 41 is attached to each of upper and lower surfaces thereof, and the matrix type resistive touch panel 60 which is attached to an upper (front) surface of the liquid crystal display panel 50 with a double-sided adhesive tape etc. being interposed therebetween.

As shown in FIG. 18, the liquid crystal display panel 50 includes, for example, an active matrix substrate 20 and a counter substrate 30 facing each other, a liquid crystal layer 40 interposed between the active matrix substrate 20 and the counter substrate 30, and a frame-like sealing member (not shown) which bonds the active matrix substrate 20 and the counter substrate 30 to each other and encloses the liquid crystal layer 40 between the active matrix substrate 20 and the counter substrate 30.

The active matrix substrate 20 includes, for example, a plurality of gate lines (not shown) provided on an insulating substrate (not shown), such as a glass substrate etc., extending in parallel with each other, a gate insulating film (not shown) provided to cover the gate lines, a plurality of source lines (not shown) provided on the gate insulating film, extending in parallel with each other in a direction perpendicular to the gate lines, a plurality of TFTs (not shown) each provided at a corresponding one of intersections of the gate lines and the source lines, interlayer insulating films (not shown) successively provided to cover the source lines and the TFTs, a plurality of pixel electrodes (not shown) arranged in a matrix on the interlayer insulating films and connected to the respective corresponding TFTs, and an alignment film (not shown) provided to cover the pixel electrodes.

The counter substrate 30 includes, for example, a black matrix (not shown) in the shape of a frame with a grid therein which is provided on an insulating substrate (not shown), such as a glass substrate etc., and directly above the gate lines and the source lines on the active matrix substrate 20, a color filter (not shown) provided in apertures of the black matrix, a common electrode (not shown) provided to cover the black matrix and the color filter, columnar photospacers (not shown) provided on the common electrode, and an alignment film (not shown) provided to cover the common electrode and the photospacers.

As shown in FIG. 18, the touch panel 60 includes a first substrate 61 and a second substrate 66 facing each other, and an air layer 65 provided as an intermediate layer between the first substrate 61 and the second substrate 66.

As shown in FIG. 18, the first substrate 61 includes, for example, a plurality of first touch panel interconnects 62 made of an ITO film etc. on an insulating substrate 10c, such as a glass substrate etc., extending in parallel with each other, a plurality of columnar spacers 63 made of an acrylic resin etc. on the insulating substrate 10c, and a protective film 64a made of a resin and provided to cover the first touch panel interconnects 62 and the spacers 63.

As shown in FIG. 18, the second substrate 66 includes, for example, a plurality of second touch panel interconnects 68 made of an ITO film etc. on an insulating substrate 10d, such as a glass substrate etc., extending in parallel with each other, and a protective film 64b made of a resin and provided to partially cover the second touch panel interconnects 68.

As shown in FIG. 18, the second touch panel interconnect 68 has a convex resin layer 67b therebelow in a region where the second touch panel interconnect 68 intersects the corresponding first touch panel interconnect 62, and therefore, has a touch pin P having a convex surface.

The top portion of the touch pin P is treated with fluorine coating to an extent that avoids film formation (a thickness of more than 1 Å and less than 100 Å) using an ink jet technique, a mask technique, etc., whereby repellency to the protective film 64b is imparted to the top portion of the touch pin P.

Therefore, as shown in FIG. 18, the top portion of the touch pin P is exposed from the protective film 64b.

In the touch panel 60 thus configured, when a surface of the second substrate 66 is pressed, the first touch panel interconnect 62 and the second touch panel interconnect 68 contact each other via the touch pin P.

According to the touch panel 60 of this embodiment and the liquid crystal display device 70 including the touch panel 60, the first touch panel interconnects 62 on the first substrate 61 and the second touch panel interconnects 68 on the second substrate 66 intersect with the protective film 64a/the air layer 65/the protective film 64b being interposed therebetween. When a surface of the second substrate 66 is pressed, conduction is established between at least one of the first touch panel interconnects 62 and at least one of the second touch panel interconnects 68 via at least one of the touch pins P connected to the second touch panel interconnects 68. Thus, a matrix type resistive touch panel is specifically implemented. Repellency to the protective film 64b is imparted to the top portion of the touch pin P, and therefore, the top portion of the touch pin P is exposed from the protective film 64b. As a result, the protective film 64b does not act as a resistance component between the first touch panel interconnect 62 and the second touch panel interconnect 68. Therefore, in the matrix type resistive touch panel 60 and the liquid crystal display device 70 including the touch panel 60, conduction can be reliably established at the top portion of the touch pin P.

In this embodiment, an active matrix drive type liquid crystal display panel has been illustrated as the display panel of the present invention. Alternatively, the present invention is applicable to other display panels, such as a passive matrix drive type liquid crystal display panel, an active matrix drive type or passive matrix drive type organic electro luminescence (EL) display panel, etc.

While a semi-transmissive liquid crystal display device has been illustrated in the above embodiments, the present invention may be applicable to a transmissive or reflective liquid crystal display device.

While a single-touch touch panel has been illustrated in the above embodiments, the present invention may be applicable to a multi-touch touch panel.

The liquid crystal display devices of the above embodiments may be any of the following types: twisted nematic (TN); vertical alignment (VA); multi-domain vertical alignment (MVA); advanced super view (ASV); in-plane-switching (IPS); etc.

INDUSTRIAL APPLICABILITY

As described above, the present invention can provide a thinner and lighter liquid crystal display device including a resistive touch panel, and therefore, is useful for automotive navigation systems, personal digital assistants (PDAs), etc., and more particularly, for any kind of mobile device, such as mobile telephones, notebook personal computers, hand-held game devices, digital cameras, etc.

DESCRIPTION OF REFERENCE CHARACTERS

CA FIRST MEMBER
CB SECOND MEMBER
H CONVEX PORTION
P TOUCH PIN
S BASE PORTION
9a, 9b ALIGNMENT FILM
11 GATE LINE (FIRST OR SECOND DISPLAY INTERCONNECT)
14a SOURCE LINE (SECOND OR FIRST DISPLAY INTERCONNECT)
19b, 19cb, 19cc, 62 FIRST TOUCH PANEL INTERCONNECT
20, 20a-20c ACTIVE MATRIX SUBSTRATE
25a, 25b BM UPPER LAYER PORTION (SECOND TOUCH PANEL INTERCONNECT)
26 PHOTOSPACER
30, 30a, 30b COUNTER SUBSTRATE
40 LIQUID CRYSTAL LAYER
50 LIQUID CRYSTAL DISPLAY PANEL
50a, 50b, 70 LIQUID CRYSTAL DISPLAY DEVICE
60 TOUCH PANEL
61 FIRST SUBSTRATE
66 SECOND SUBSTRATE
64a, 64b PROTECTIVE FILM
65 AIR LAYER (INTERMEDIATE LAYER)
68 SECOND TOUCH PANEL INTERCONNECT

The invention claimed is:

1. A liquid crystal display device comprising:
an active matrix substrate including a plurality of first touch panel interconnects extending in parallel with each other;
a counter substrate facing the active matrix substrate and including a plurality of second touch panel interconnects extending in parallel with each other in a direction intersecting the first touch panel interconnects;
a liquid crystal layer provided between the active matrix substrate and the counter substrate with an alignment film being interposed between the liquid crystal layer and each of the active matrix substrate and the counter substrate; and
a plurality of columnar touch pins connected to the first or second touch panel interconnects,
wherein
when a surface of the active matrix substrate or the counter substrate is pressed, conduction is established between at least one of the first touch panel interconnects and a corresponding at least one of the second touch panel interconnects via a corresponding at least one of the touch pins, and
repellency to the alignment film is imparted to at least a portion of a top portion of each of the touch pins.

2. The liquid crystal display device of claim 1, wherein the touch pins each have a top portion including a first member and a second member made of different materials.

3. The liquid crystal display device of claim 2, wherein the first member is made of a conductive inorganic material, and
the second member is made of an organic material.

4. The liquid crystal display device of claim 3, wherein the first member is arranged to cover a portion of the second member.

5. The liquid crystal display device of claim 2, wherein the first member is made of a conductive inorganic material, and
the second member is made of a conductive inorganic material different from that of the first member.

6. The liquid crystal display device of claim 1, wherein the touch pins each have a top portion treated with fluorine coating.

7. The liquid crystal display device of claim 1, wherein the touch pins each have a top portion including a concave portion and a convex portion.

8. The liquid crystal display device of claim 1, wherein the touch pins each have a top portion including a convex portion.

9. The liquid crystal display device of claim 8, wherein the touch pins each have a base portion made of an organic material, and
the convex portion is made of a conductive inorganic material.

10. The liquid crystal display device of claim 9, wherein the convex portion is arranged to cover a portion of the base portion.

11. The liquid crystal display device of claim 8, wherein the touch pins each have a base portion made of a conductive inorganic material, and
the convex portion is made of a conductive inorganic material different from that of the base portion.

12. The liquid crystal display device of claim 1, wherein the active matrix substrate includes a plurality of first display interconnects extending in parallel with each other, and a plurality of second display interconnects extending in parallel with each other in a direction intersecting the first display interconnects,
the first touch panel interconnects are arranged along the respective corresponding first display interconnects, and
the second touch panel interconnects are arranged along the respective corresponding second display interconnects.

13. The liquid crystal display devices of claim 1, wherein a columnar photospacer configured to determine a thickness of the liquid crystal layer is provided on the active matrix substrate or the counter substrate.

14. A touch panel comprising:
a first substrate including a plurality of first touch panel interconnects extending in parallel with each other;
a second substrate facing the first substrate and including a plurality of second touch panel interconnects extending in parallel with each other in a direction intersecting the first touch panel interconnects;
an intermediate layer provided between the first and second substrates with a protective film being interposed between the intermediate layer and each of the first and second substrates; and
a plurality of columnar touch pins connected to the first or second touch panel interconnects,
wherein
when a surface of the first or second substrate is pressed, conduction is established between at least one of the first touch panel interconnects and a corresponding at least one of the second touch panel interconnects via a corresponding at least one of the touch pins, and
repellency to the protective film is imparted to at least a portion of a top portion of each of the touch pins.

15. A display device comprising:
the touch panel of claim 14; and
a display panel facing the touch panel.

\* \* \* \* \*